US009438775B2

(12) United States Patent
Powers et al.

(10) Patent No.: US 9,438,775 B2
(45) Date of Patent: Sep. 6, 2016

(54) APPARATUS FOR REAL-TIME 3D CAPTURE
(71) Applicant: Occipital, Inc., San Francisco, CA (US)
(72) Inventors: Jeffrey Powers, San Francisco, CA (US); Vikas Reddy, Boulder, CO (US); Mahmut Candemir Orsan, Superior, CO (US); Forrest Heller, Boulder, CO (US); Patrick O'Keefe, San Francisco, CA (US); YunJa Chen, Boulder, CO (US)
(73) Assignee: Occipital, Inc., Boulder, CO (US)
( * ) Notice: Subject to any disclaimer, the term of this patent is extended or adjusted under 35 U.S.C. 154(b) by 244 days.
(21) Appl. No.: 14/028,868
(22) Filed: Sep. 17, 2013
(65) Prior Publication Data
US 2015/0077517 A1    Mar. 19, 2015
(51) Int. Cl.
*H04N 7/18* (2006.01)
*H04N 5/225* (2006.01)
*H04N 13/02* (2006.01)
*H04N 5/232* (2006.01)
(52) U.S. Cl.
CPC ........ *H04N 5/2253* (2013.01); *H04N 5/23241* (2013.01); *H04N 13/0207* (2013.01); *H04N 13/0253* (2013.01); *H04N 13/0271* (2013.01); *H04N 2213/001* (2013.01)
(58) Field of Classification Search
None
See application file for complete search history.

(56) References Cited

U.S. PATENT DOCUMENTS

| | | | | |
|---|---|---|---|---|
| 6,303,209 | B1* | 10/2001 | Kobayashi | C09D 7/00 165/104.33 |
| 2008/0268900 | A1* | 10/2008 | Lee | H04N 5/74 455/556.1 |
| 2009/0184849 | A1 | 7/2009 | Nasiri et al. | |
| 2010/0160006 | A1* | 6/2010 | Wu | H04M 1/0264 455/575.1 |
| 2012/0257008 | A1* | 10/2012 | Taylor | H04N 5/2252 348/36 |
| 2012/0281087 | A1 | 11/2012 | Kruse | |
| 2013/0322708 | A1* | 12/2013 | Heringslack | G06K 9/00288 382/118 |
| 2013/0329064 | A1* | 12/2013 | Price | H04N 19/132 348/208.6 |
| 2014/0066123 | A1* | 3/2014 | Huang | H04M 19/047 455/556.1 |
| 2014/0139639 | A1 | 5/2014 | Wagner et al. | |
| 2014/0354868 | A1* | 12/2014 | Desmarais | H04N 5/23293 348/333.01 |
| 2014/0368639 | A1* | 12/2014 | Wu | G01B 11/00 348/136 |
| 2015/0029294 | A1* | 1/2015 | Lin | H04N 7/141 348/14.01 |
| 2015/0050922 | A1* | 2/2015 | Ramalingam | H04W 12/08 455/418 |
| 2015/0126244 | A1* | 5/2015 | Moran | G06K 9/209 455/556.1 |

* cited by examiner

*Primary Examiner* — James M Anderson, II
(74) *Attorney, Agent, or Firm* — Jeffrey Schox; Thomas Gwinn

(57) ABSTRACT

One variation of a real-time 3D capture system for a mobile electronic device having a camera includes an infrared projector that projects a pattern onto an imaging target; an infrared sensor that captures the pattern; a control module that controls the projector and sensor, takes data from the sensor, determines depth information from the data, and transmits the depth information to the mobile electronic device; a battery that provides power to the projector, sensor, and control module; a software module connected to the mobile electronic device that controls communication of data from the camera and depth information between the control module and the mobile electronic device; a mounting bracket that removably attaches the apparatus to the mobile electronic device such that the capture system when attached maintains alignment with the camera; and a chassis that holds the projector, sensor, control module, and battery, and attaches to the mounting bracket.

22 Claims, 4 Drawing Sheets

APPARATUS FOR REAL-TIME 3D CAPTURE

TECHNICAL FIELD

This invention relates generally to the 3D imaging field, and more specifically to a new and useful apparatus for real-time 3D capture in conjunction with a mobile electronic device having a camera.

BACKGROUND

The field of 3D imaging is a rapidly growing area of interest with numerous applications, including applications in construction, manufacturing, research, entertainment, and medicine. A number of these applications require 3D image capture that can perform imaging in real-time and in-situ. Current 3D image capture solutions that meet these criteria are often expensive, bulky, power-hungry, and operate on proprietary hardware. Providing a novel solution to 3D image capture that performs significantly better in these areas is not only useful for current applications, but is also potentially capable of opening up new fields of application as well. Thus, there is a need in the field of 3D imaging to create a new and useful apparatus to perform real-time 3D capture. This invention provides such a new and useful apparatus.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
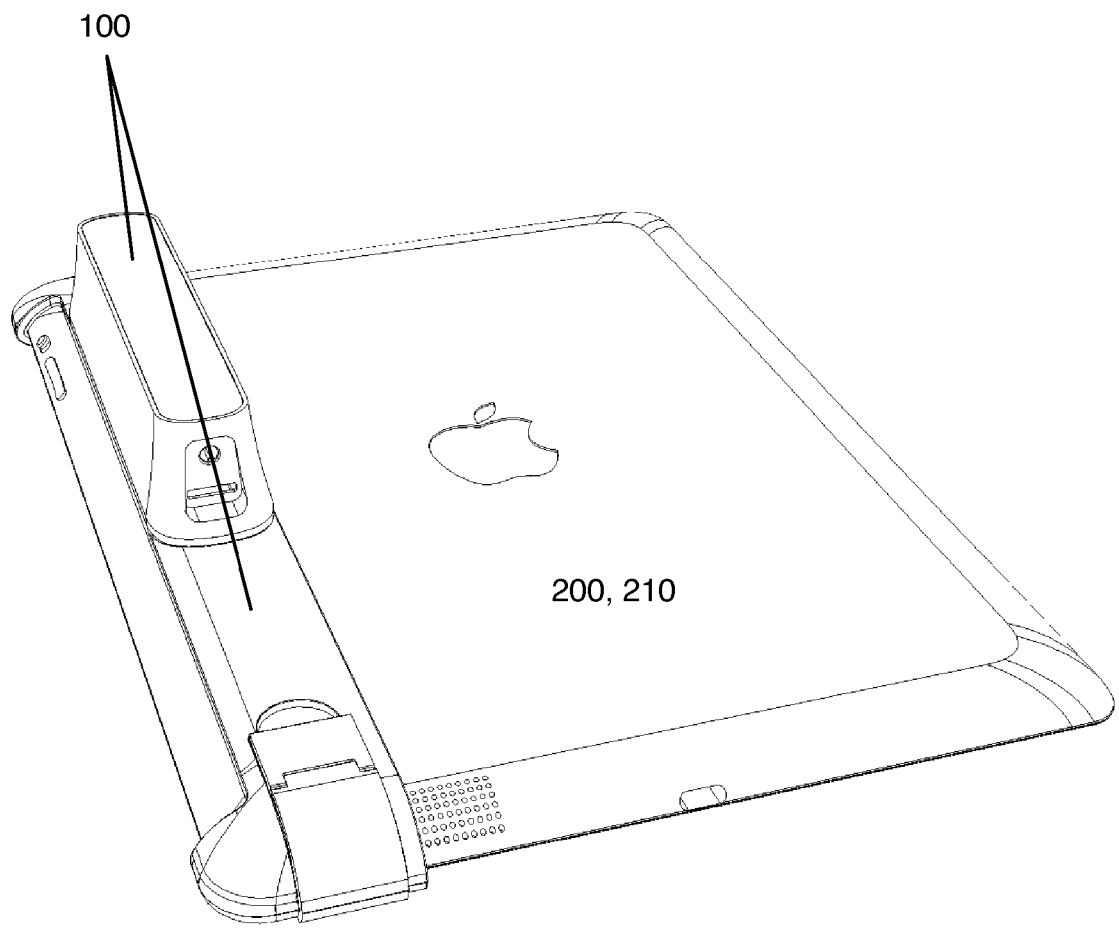
FIG. 1 is a schematic representation of a system of a preferred embodiment of the invention.

As shown in FIG. 1, an apparatus 100 of a preferred embodiment performs real-time 3D capture in conjunction with a mobile electronic device 200 having a camera 210. The apparatus 100 includes an infrared projector 110 that projects a pattern onto an imaging target; an infrared sensor 120 that captures the pattern; a control module 130 that controls the projector 110 and sensor 120, takes data from the sensor 120, determines depth information from the data, and transmits the depth information to the mobile electronic device 200; a battery 140 that provides power to the projector 110, sensor 120, and control module iso; a software module 150 connected to the mobile electronic device 200 that controls how data from the camera 210 and the depth information is communicated between the control module 130 and the mobile electronic device 200; a mounting bracket 160 that removably couples the apparatus 100 to the mobile electronic device 200 such that the apparatus 100, when coupled, maintains alignment with the camera 210; and a chassis 170 that holds the projector 110, sensor 120, control module 130, and battery 140 and couples to the mounting bracket 160, wherein the projector 110, sensor 120, and control module 130 are fixed to the chassis 170.

The apparatus 100 could be used for a variety of situations, with a variety of different mobile electronic devices 200. The mobile electronic device 200 is preferably a tablet (e.g., an iPad) but may alternatively be any mobile electronic device having a camera and for which the mobile electronic device is suitable for attaching to the apparatus 100. For example, the apparatus 100 in conjunction with the mobile electronic device 200 could be used to image a room and the contents of it from a number of perspectives to create a three-dimensional representation of the room and its contents. As another example, the apparatus 100, in conjunction with the mobile electronic device 200, could be used to record motion in three dimensions from one perspective. The system of apparatus 100 and mobile electronic device 200 could allow for 3D imaging to be performed for applications where current solutions require too much power or are cost-prohibitive, or for 3D imaging to be performed by users unfamiliar with 3D capture technology (i.e., users for whom an overly technical interface or setup process could prevent them from performing 3D capture).

The infrared projector 110 functions to project a pattern of infrared light spots onto an imaging target. The light emitted by the projector 110 is preferably of a wavelength between 817 and 837 nanometers, but may alternatively be of a near infrared wavelength (i.e., 700 nanometers to 1400 nanometers) or of any infrared wavelength (i.e., 700 nanometers to 1 millimeter). Infrared light is chosen so that the projected light spots are not visible to the eye or to the camera 210. As a result, the spots can be detected in any visible ambient light by a suitable sensor (including total darkness as perceived by the eye or the camera 210). The peak wavelength of the light is preferably constant, but alternatively may vary based on factors including environment and imaging target. The pattern is preferably a pseudo-random speckle pattern, but may alternatively be any pattern that when projected onto an imaging target deforms according to the distance from the projector to the imaging target (also called the depth) (e.g., a regularly spaced grid of spots). The pattern preferably has high uniformity, which enables a high uniformity of depth information captured by the sensor 120. The projector 110 is preferably connected to and controlled by the control module 130. The light source of the projector 110 is preferably a laser diode, but may alternatively be any light source capable of emitting in the infrared. The pattern is preferably not modifiable, but alternatively may be modified either by electrical control of the infrared projector 110 or by changing hardware in the infrared projector 110. The pattern is preferably formed by a laser diode emitting through a lens and two diffraction gratings, but alternatively may be formed by any suitable method. The projector 110 is preferably fixed to the chassis 170, but may alternatively be removable from the chassis 170.

In a variation of the preferred embodiment, the projector 110 is coupled to a thermoelectric cooler 111. The thermoelectric cooler 111 preferably is coupled on one side to the projector 110 by a heatsink on the projector 110 made of a thermally conductive material (e.g., aluminum or copper), but may alternatively be coupled by any method that allows for heat transfer between the projector 110 and the thermoelectric cooler 111. The thermoelectric cooler 111 is preferably coupled to this heatsink with thermal putty, but may alternatively be coupled by any other suitable means. The thermoelectric cooler 111 is preferably coupled on the other side to the chassis 170 with a phase change material but may alternatively be coupled by any method that allows for heat transfer between the thermoelectric cooler 111 and the chassis 170. The thermoelectric cooler 111 is preferably controlled by the control module 130. The thermoelectric cooler 111 serves to pump heat from the chassis 170 to the projector 110 or from the projector 110 to the chassis 170. The direction of heat pumping is preferably modified by the control module 130.

In another variation of the preferred embodiment, the apparatus 100 is as described in the above variation, but also has a temperature detection mechanism 112. The temperature detection mechanism 112 preferably serves to measure the temperature of the projector 110 or near the projector 110, but may alternatively measure another parameter of the projector 110 linked to temperature; for example, the output wavelength of the projector 110. The temperature detection mechanism 112 is preferably a thermistor, but may alternatively be any suitable mechanism for measuring temperature or another parameter of the projector 110 linked to temperature. The temperature detection mechanism 112 is preferably attached to a heatsink on the projector 110, but may alternatively be placed in any other location suitable for measuring the temperature of the projector 110 or another parameter of the projector 110 linked to temperature. The temperature detection mechanism 112 is preferably connected to the control module 130. The control module 130 preferably changes the direction and magnitude of heat pumping of the thermoelectric cooler 111 (and thus the temperatures of the projector 110 and the chassis 170) based on the output of the temperature detection mechanism 112. The control module 130 preferably attempts to keep the projector 110 at a constant temperature of 37 degrees Celsius, but may alternatively keep the projector 110 at a different constant temperature or may vary the temperature of the projector 110 based on input from the control module 130.

The infrared sensor 120 preferably functions to capture the pattern of infrared spots projected by the infrared projector 110. Alternatively, the sensor 120 may also capture other infrared light (e.g., to provide for night vision capability). The sensor 120 preferably captures only light of a wavelength between 817 and 837 nanometers, but may alternatively also capture light of near infrared wavelengths (e.g., 700 nanometers to 1400 nanometers) or of other infrared wavelengths (e.g., 700 nanometers to 1 millimeter). The sensor 120 is preferably a CMOS image sensor with a lens and a narrow passband infrared filter placed over the sensor, but may alternatively be any other suitable infrared sensor. The sensor 120 preferably has vertical and horizontal fields of view equal to or greater than the vertical and horizontal fields of view of the camera 210. The sensor 120 is preferably connected to and controlled by the control module 130. The sensor 120 preferably sends image output to the control module 130, but alternatively may send image output to the mobile electronic device 200. The sensor 120 is preferably fixed to the chassis 170, but may alternatively be removable from the chassis 170.

The control module 130 preferably functions to control the projector 110 and the sensor 120, route power in the apparatus 100, and handle communication between the apparatus 100 and the mobile electronic device 200. The control module 130 preferably includes a printed circuit board with connections for data and power, as well as microprocessors for control, power routing, and communication. The control module 130 is preferably hardware and firmware, but may alternatively include some software in memory or in firmware. The control module 130 is preferably fixed to the chassis 170. The controlling of the projector 110 and the sensor 120 preferably includes turning the projector 110 and the sensor 120 on and off and changing any electrically controllable operating parameters of the projector 110 and the sensor 120. The control module 130 preferably routes power from the battery 140 to the sensor 120, the projector 110, and any other components in the apparatus 100 that require power. The control module 130 may alternatively route power from the mobile electronic device 200 to components in the apparatus 100, or route power from the battery 140 to the mobile electronic device 200. The control module 130 preferably includes a dedicated power port. The power port preferably detects the type of power adaptor connected to it and selectively passes power to components of the apparatus 100 or the mobile electronic device 200 based on the power capacity of the connected power adaptor. The control module 130 preferably controls communication between the mobile electronic device 200 and the apparatus 100. The control module 130 preferably includes a data port that is compatible with both Apple Lightning connectors and USB connectors through the use of separate cables, but may alternatively include any other suitable mechanism for connecting to the mobile electronic device 200. For example, the control module 130 may include a Bluetooth or Wi-Fi connection. The control module 130 preferably performs computations related to image processing (e.g., computing depth maps from data from the sensor 120). An example method of computing depth information is found in U.S. Pat. No. 8,400,494 B2, filed 14 Mar. 2006, which is incorporated in its entirety by this reference. The control module 130 preferably receives data from the camera 210 and registers the data from the camera 210 to the depth maps from the data of the sensor 120. Alternatively, the control module 130 may pass the raw data or depth maps from the sensor to the software module 150, and registration computations may be performed in software.

In one implementation, the control module 130 includes two microprocessors; a system microprocessor and a signal processing microprocessor. In this implementation, the signal processing microprocessor preferably computes depth values from data from the sensor 120. Alternatively, the signal processing microprocessor may also register the depth values with data from the camera 210. The system microprocessor preferably controls all of the other functions of the control module 130, including power routing to the signal processing microprocessor. Alternatively, the signal processing microprocessor can control some of the other functions of the control module 130 while active, and cede this control to the system microprocessor when shut down. When the sensor 120 is not actively being used, the system microprocessor can preferably shut down power to the signal processing microprocessor to save power. Both microprocessors are preferably part of a printed circuit board of the control module 130, and communicate using a shared I2C bus.

In one implementation, the control module 130 temporally synchronizes the sensor 120 to the camera 210, so that frames captured by the sensor 120 are taken at the same time (or as close as possible) to frames captured by the camera 210. Temporal synchronization is preferably implemented by first synchronizing the clock of the mobile electronic device 200 to an internal clock in the apparatus 100. The internal clock is preferably part of the control module 130 but may alternatively be part of the sensor 120. After the clocks are synchronized, timestamps from the mobile electronic device 200 and from the apparatus 100 are compared, and the timing of frames captured from the sensor 120 is adjusted based on the difference in timestamps. Temporal synchronization may alternatively be implemented by any technique that enables frame capture by the sensor 120 to be synchronized with frame capture by the camera 210.

The battery 140 functions to provide power to the apparatus 100. The battery 140 preferably connects to the control module 130, but alternatively may connect to the apparatus 100 in any other suitable way. The battery 140 preferably provides power to the apparatus 100, but alternatively also provides power to the mobile electronic device 200. The battery is preferably charged through a power port in the control module 130, but alternatively may be charged through alternative means (e.g., through a data port in the control module 130 or directly by the mobile electronic device 200). The battery 140 is preferably a lithium-ion polymer battery with a capacity of greater than 1200 mAh, but alternatively may be any suitable energy storage device. The battery 140 preferably includes temperature and voltage monitoring circuits that protect the battery 140 and the apparatus 100 from undesirable operating conditions (e.g., the battery 140 overheating or providing a voltage lower or higher than the set operating voltage). The battery 140 is preferably fixed to the chassis 170, but may alternatively be removably held by the chassis 170 or mounted to the mounting bracket 160.

Figure 4:
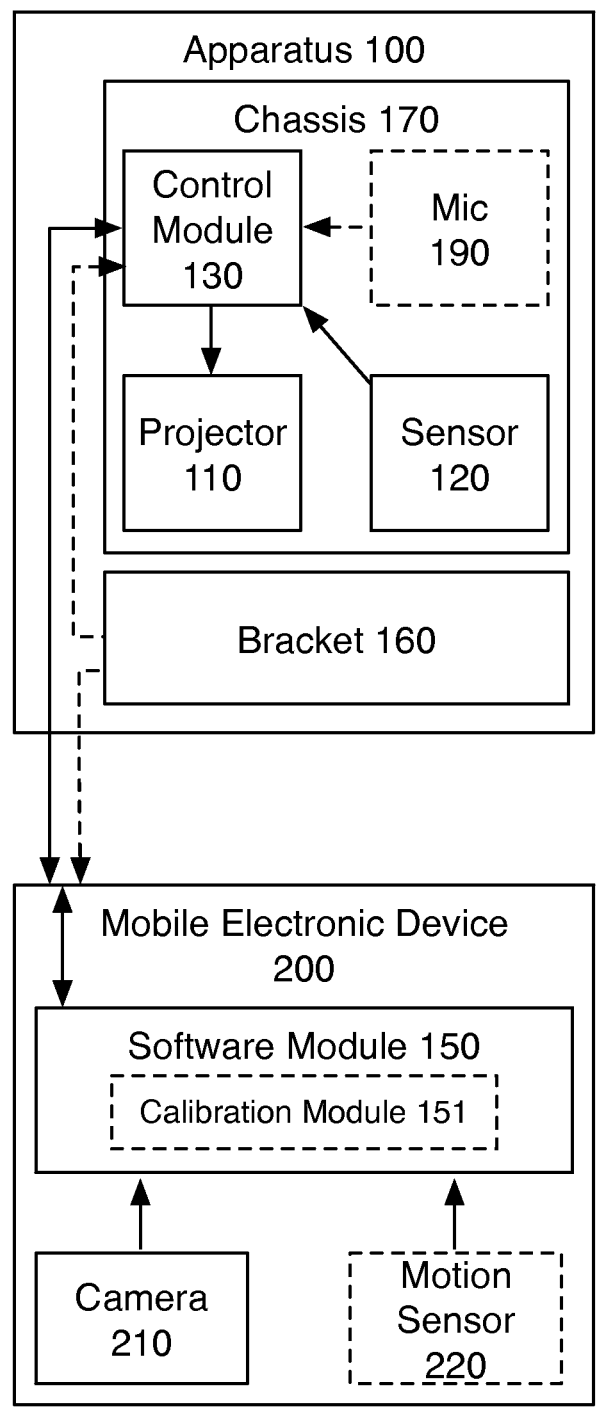

The software module 150 preferably functions to control communication between the control module 130 and the mobile electronic device 200 as shown in FIG. 4, including image data from the camera 210 and depth information from the control module 130. The software module 150 preferably receives depth information from the control module 130 and computes registration parameters for the depth information and the output of the camera 210. The software module 150 then preferably sends the registration parameters to the control module 130, which performs registration based on the registration parameters and returns registered data to the software module 150. Alternatively, the software module 150 may itself perform registration using the registration parameters or the software module 150 may send image data from the camera 210 directly to the control module 130. Depth information from the control module 130 is preferably a depth map, but may alternatively be any suitable description of depth (e.g., distance from sensor 120 to an imaging target). Registration is preferably performed by aligning points in the image of the camera 210 to points in the depth map, then creating a linked set of a 2D color image and depth values for each point in that color image. After registration, the software module 150 preferably converts the linked set into a 3D representation of the imaging target and stores the representation on the mobile electronic device 200. Alternatively, the software module 150 may store the raw data of the linked set on the mobile electronic device 200 or transmit that raw data to another device. The software module 150 preferably controls the display of the 2D color image as well as the 3D representation on the mobile electronic device 200. The software module 150 preferably configures in part the control module 130 (e.g., the software module 150 may control at what rate the control module 130 captures data from the sensor 120 or when the control module 130 turns on light-emitting diodes). Configuration is preferably enabled by the input interface of the mobile electronic device 200, but may alternatively be enabled by another suitable interface. The software module 150 preferably runs in part on the mobile electronic device 200, but may alternatively be run completely on the mobile electronic device 200.

In one variation of the preferred embodiment, the apparatus 100 includes a calibration module 151. The calibration module 151 preferably is part of the software module 150. The calibration module 151 functions to enable correction for rotation and translation of the sensor 120 relative to the camera 210. The calibration module 151 preferably enables only minor corrections for rotation and translation while major corrections are performed by alignment of the mounting bracket 160. The calibration module 151 preferably enables correction for rotation and translation by correlating pixels of image data from the camera 210 to pixels of the image data from the sensor 120. This correlation preferably correlates the pixels of the image data from the camera 210 that image one particular area of an imaging target to the pixels of the image data from the sensor 120 that image the same particular area. This correlation is preferably performed automatically by the calibration module 151, but may alternatively be performed manually through the interface of the mobile electronic device 200. One example of automatic correlation would be to image a known 2D pattern visible to both the camera 210 and the sensor 120; the calibration module 151 could then align the two images and determine the correlation. Another example of automatic correlation would be to determine correlation by comparing data from the camera 210 and the sensor 120 over time as the apparatus moves; this enables automatic correlation without a known 2D pattern. An example of manual correlation would be to provide a view of both the image of the camera 210 and the raw image data of the sensor 120 and allow a user to manually align the two images through the interface of the mobile electronic device 200. The calibration module 151 preferably provides correlation information to the software module 150 to be used for registration, but may alternatively provide the information directly to the control module 130 to be used for registration. Alternatively, the calibration module 151 may enable correction for rotation and translation by computing the rotation and translation of the sensor 120 relative to the camera 210 and passing the results of these computations to the software module 150 or the control module 130 to be used for the correction of rotation and translation during registration.

Figure 3:
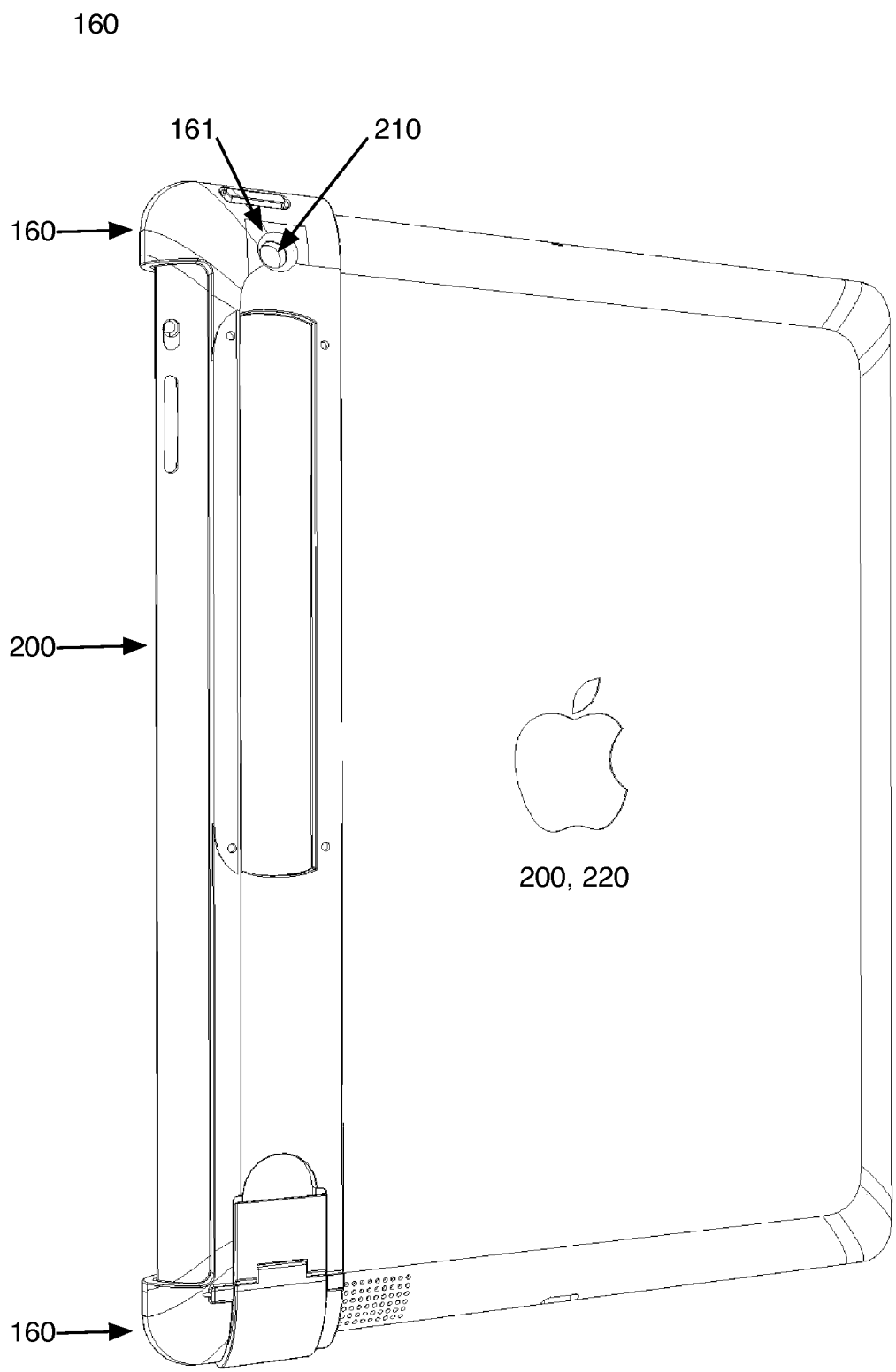
FIG. 3 is schematic representation of the bracket of a system of a preferred embodiment; and,
FIG. 4 is a flowchart representation of the data flow of a system of a preferred embodiment.

The mounting bracket 160, as shown in FIG. 3 functions to attach the apparatus 100 to the mobile electronic device 200 so that the apparatus 100 is secured to, but removable from, the mobile electronic device 200. The mounting bracket 160 also functions to align the apparatus 100 to the mobile electronic device 200, and specifically to align the camera 210 to the sensor 120. The mounting bracket 160 is preferably mechanically rigid to allow for precise and repeatable alignment. Once attached, the mounting bracket 160 preferably maintains its alignment to the camera 210; i.e. the mounting bracket 160 is not translated or rotated from its position after attachment beyond alignment tolerance levels. Alignment tolerance levels are preferably levels that allow suitable use of the apparatus 100 without recalibration. The mounting bracket 160 preferably attaches to two corners of the mobile electronic device 200, but alternatively may attach in any suitable way to prevent movement of the sensor 120 relative to the camera 210. The mounting bracket 160 alternatively may attach to only one corner of the mobile electronic device 200. The mounting bracket 160 preferably wraps around the edge of the mobile electronic device 200 in at least one location to hold the mounting bracket 160 in place (e.g., as shown in FIG. 3, the mounting bracket 160, mounted on one side of the mobile electronic device 200, wraps around the corners where it is attached to contact the other side of the mobile electronic device 200). The mounting bracket 160 preferably has a latching mechanism, so that the bracket 160 may be placed on the mobile electronic device 200 or removed from the mobile electronic device 200 easily when the latching mechanism is unlatched. When the latching mechanism is latched, removal of the mounting bracket 160 from the mobile electronic device 200 is preferably very difficult or impossible. Alternatively, the mounting bracket 160 may not have a latch and instead clip on to the mobile electronic device 200, or may attach to the mobile electronic device 200 with any other suitable method. The mounting bracket 160 preferably does not cover buttons or other interface methods on the mobile electronic device 200, but alternatively may include pass-throughs for buttons covered by the bracket. The mounting bracket 160 preferably only covers as much of the mobile electronic device 200 as is necessary for attaching and aligning the apparatus 100, but alternatively may cover more of the mobile electronic device 200 to provide protection from damage. The mounting bracket 160 is preferably made of a rigid plastic, but may alternatively be made of any other material or combination of materials suitable for precise and repeatable alignment (e.g., metals, plastics, or rubbers). In one variation of the preferred embodiment, the mounting bracket 160 is coated with a thermoplastic polyurethane layer where the mounting bracket 160 contacts the mobile electronic device 200 to increase adhesion to the mobile electronic device 200. The mounting bracket 160 preferably has a cut-out for the camera 210, but alternatively may be of any other design that does not obscure the camera 210. The chassis 170 is preferably mounted on the mounting bracket 160 so that it moves as minimally as is mechanically possible while attached, but can be removed when desired (to allow for the use of one chassis 170 with multiple mounting brackets 160). Alternatively, the position of the chassis 170 in the mounting bracket 160 may be adjustable in a controlled manner while attached; for example, the mounting bracket 160 may have screws that adjust the translational and rotational position of the chassis 170 within the mounting bracket 160. The mounting bracket 160 preferably has an attachment mechanism that automatically secures the chassis 170 when placed on the mounting bracket 160, but allows for quick removal (for example, with a release button on the mounting bracket 160). Alternatively, the chassis 170 may be attached to the mounting bracket 160 with any other suitable mechanism (e.g. screws), or the chassis 170 may be fixed to the mounting bracket 160. The mounting bracket 160 preferably includes a cut-out for the chassis 170, so that the chassis 170 minimally extends outward from the mounting bracket 160 (to help prevent the chassis 170 from obscuring the field of view of the camera 210). Alternatively, the chassis 170 may be mounted on a solid section of the mounting bracket 160; which may be thinner than or of equal thickness to other portions of the mounting bracket 160. The chassis 170 preferably is attached to the mounting bracket 160 to minimize the distance between the sensor 120 and the camera 210, but alternatively may be attached at any location suitable for 3D capture. The chassis 170 is preferably aligned when attached to the mounting bracket 160 so that the camera 210, the sensor 120, and the projector 110 are all along the same camera axis (as shown in FIG. 1). Camera axes here represent the axes of the sensor in the camera 210; for example, the camera x-axis is the axis parallel to one side (the "horizontal" side) of the sensor in the camera 210, and is the x-axis along which the horizontal field-of-view is taken. The chassis 170 is also preferably aligned to maximize the overlap of the field of view of the camera 210 and the sensor 120 while minimizing the intrusion of the apparatus 100 into the field of view of the camera 210.

In one variation of the preferred embodiment, the mounting bracket 160 includes a mechanism for electrically connecting the mobile electronic device 200 to the control module 130. This mechanism preferably includes an electrical connection formed by the mounting bracket 160 and the chassis 170 when the chassis 170 is attached to the mounting bracket 160, but may alternatively include any other method of electrical connection; wireless (e.g., power via induction) or wired. For example, the mounting bracket 160 may integrate a wire that plugs into the control module 130. This mechanism also preferably includes an electrical connection formed by the mounting bracket 160 and the mobile electronic device 200; for example, a mounting bracket for an iPad may feature an Apple Lightning connector that is positioned so as to plug into the iPad whenever the mounting bracket is attached to the iPad. If the mechanism blocks a data or power port on the mobile electronic device 200, it preferably includes a pass-through or alternate port to allow access to the functionality of the blocked port. In another variation of the preferred embodiment, the battery 140 is attached to the chassis 170 and the mounting bracket 160 also includes a secondary battery to supplement battery 140.

Figure 2:
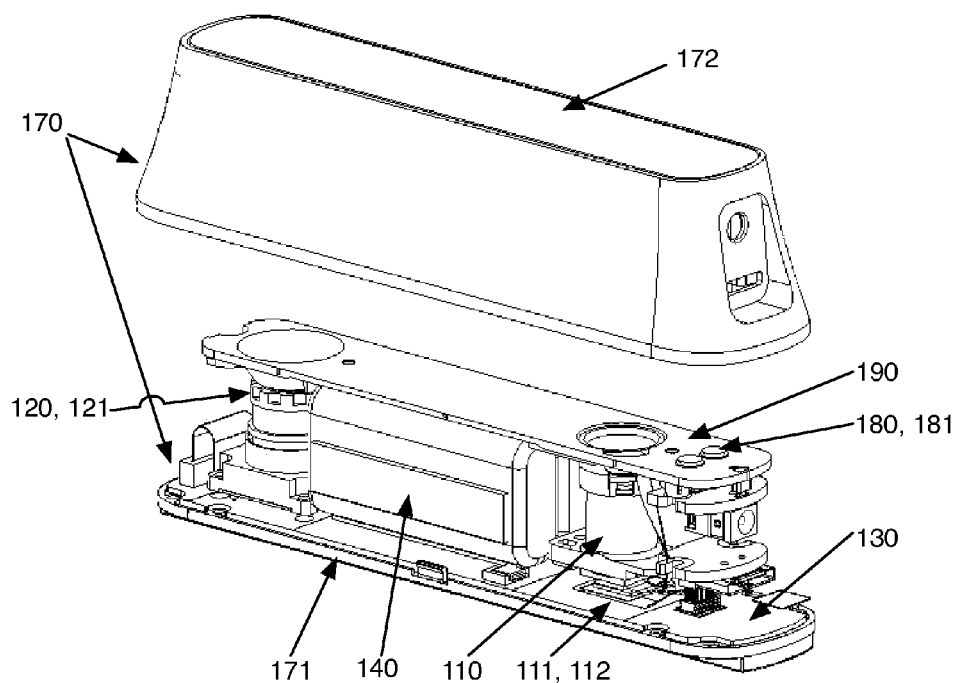
FIG. 2 is a schematic representation of the chassis of a system of a preferred embodiment.

The chassis 170, as shown in FIG. 2, functions to hold the projector 110, sensor 120, control module 130 and battery 140, and to attach to the mounting bracket 160. The projector 110, sensor 120, and control module 130 are preferably fixed to the chassis 170, but may alternatively be replaceable. If the sensor 120 is replaceable, the chassis 170 preferably includes a mechanism for moving the position of the sensor 120 while attached to the chassis 170 to allow for alignment between the sensor 120 and the camera 210. The projector 110 is preferably secured to the chassis 170 with screws, but alternatively may be secured by plugs, epoxy or other suitable techniques. The sensor 120 and control module 130 are preferably secured to the chassis 170 with screws, but alternatively may be secured by plugs, epoxy, or other suitable techniques. The sensor 120 is preferably placed close to one end of the chassis 170 to enable the sensor 120 to be as close to the camera 210 as possible without obstructing the camera 210's view when the chassis 170 is mounted in the mounting bracket 160. The chassis 170 is preferably of a width determined by the wider of the sensor 120 and the projector 110 (i.e., the design is preferably "stretched out" to maximize length and minimize width while also minimizing total size of the chassis 170). Alternatively, the chassis 170 may be of any suitable form factor. The chassis 170's thickness (i.e., the distance from the side where the chassis 170 meets the mounting bracket 160, the back side, to the side where the projector 110 emits light, the front side) is preferably as small as possible to further reduce the possibility of the chassis 170 obstructing the camera 210's field of view. The chassis 170 preferably also functions to dissipate heat produced by the apparatus 100. The chassis 170 is preferably the main heatsink for the components of apparatus 100 and is preferably designed to provide for efficient heat transfer between the apparatus 100 and air surrounding the apparatus 100. In one variation, the chassis 170 includes heat dissipation features; for example, fins, fans, or other mechanisms to improve heat transfer between the apparatus 100 and the environment. The chassis 170 is preferably made primarily from aluminum alloy 6061 with a MT11005 anodization, but may alternatively be made with any suitable material suitable for both structural and thermal needs of the apparatus 100. If there is an anodization layer, it preferably increases the emissivity of the chassis 170. The material preferably has a thermal conductivity of greater than 150 W/mK at room temperature. The chassis 170 preferably has an insulating backplate 171 that is between the chassis 170 and the mounting bracket 160 or between the chassis 170 and the mobile electronic device 200. This backplate 171 functions to thermally isolate the apparatus 100 from the mobile electronic device 200. The insulating backplate 171 is preferably polycarbonate but may alternatively be any material suitable for thermal isolation. The insulating backplate 171 preferably has a thermal conductivity of less than 5 W/mK at room temperature. The backplate 171 is preferably attached to the chassis 170 with screws, but may alternatively be attached in any other suitable manner (e.g., epoxy). The chassis 170 preferably also has a cover 172 that functions to protect the sensor 120 and projector 110 from damage while still allowing transmission of light. The cover 172 is preferably transparent for only the wavelengths of light emitted by the projector 110, but may also be transparent for other wavelengths of light as well. The cover 172 preferably is not easily scratched, reflects minimal light, and does not easily show fingerprint oils. The cover 172 is preferably tempered Schott D263 glass, but may alternatively be any material chosen for the above preferences. The cover 172 is preferably coated with an anti-reflective coating and an anti-fingerprint coating. The cover 172 is preferably attached with double-sided tape to the front of the chassis 170 but may alternatively be attached in any other suitable manner.

In a variation of the preferred embodiment, the apparatus 100 includes a wide-angle lens 161. The wide angle lens 161 functions to increase the field of view of the camera 210. The wide-angle lens 161 is preferably attached to the mounting bracket 160 such that when the mounting bracket 160 is attached to the mobile electronic device 200, the wide-angle lens 161 is directly over (in the light path of) the camera 210. The wide-angle lens 161 is preferably transparent in all wavelengths of light sensed by the camera 210. The wide-angle lens 161 is preferably fixed to the mounting bracket 160, but alternatively may be removable to allow for changing the lens 161 for a different type of lens. If the lens 161 is removable, the mounting bracket 160 preferably allows for adjusting the position of the chassis 170 when mounted (to prevent the chassis 170 from being in the field of view of the camera 210 when a higher field of view lens 161 is attached). The lens 161 is preferably made of glass but may alternatively be made of any suitable material.

In a variation of the preferred embodiment, the apparatus 100 includes two infrared light-emitting diodes (IR LEDs) 180. These IR LEDs 180 preferably function to invisibly illuminate an imaging target to allow the sensor 120 to capture an imaging target when there is not enough ambient light for the imaging target to be captured visibly. The IR LEDs 180 may alternatively also function to enable communication between multiple apparatuses 100 (e.g., to allow for syncing and simultaneous capture of an imaging target from multiple perspectives). The IR LEDs 180 may alternatively also function to enable the collection of 3D information by the apparatus 100 using the technique of depth from stereo (i.e., infrared illumination allows the sensor 120 to capture an image similar to, but in a different spectrum from, the camera 210). The images from the sensor 120 and camera 210 could be used, along with the position of the sensor 120 relative to the camera 210, to determine 3D information about an imaging target using the technique of depth from stereo. The light emitted by the IR LEDs 180 is preferably of a wavelength between 817 and 837 nanometers, but may alternatively be of a near infrared wavelength (e.g., 700 nanometers to 1400 nanometers) or of any infrared wavelength (e.g., 700 nanometers to 1 millimeter). Infrared light is chosen so that the light is not visible to the eye or to the camera 210. The IR LEDs 180 are preferably fixed in the chassis 170, but may alternatively be placed in any other suitable position and be attached in any other suitable manner. The IR LEDs 180 are preferably electrically connected to and controlled by the control module 130. The IR LEDs 180 are preferably operated in a constant current mode, but may alternatively be operated in a pulsing (i.e., flashing) mode.

In a variation of the preferred embodiment, the apparatus 100 includes a white light-emitting diode (LED) 181. The white LED 181 functions to provide white-light illumination to the imaging target to allow for a brighter image to be captured by the camera 210. The white LED 181 is preferably a phosphor material based LED, but may alternatively be a red, green, blue (RGB) LED. The emission spectra of the white LED 181 is preferably fixed, but may also be electrically adjustable (e.g., the in the case of an RGB LED). The white LED 181 preferably emits light in the visible spectrum such that the difference between the longest and shortest wavelengths of emission is at least 100 nanometers. The white LED 181 is preferably fixed in the chassis 170 but may alternatively be placed in any other suitable position and be attached in any other suitable manner. The white LED 181 is preferably electrically connected to and controlled by the control module 130. The white LED 181 is preferably operated in a constant current mode, but may alternatively be operated in a pulsing (i.e., flashing) mode.

In a variation of the preferred embodiment, the apparatus 100 includes a microphone 190. The microphone 190 functions to record sound in the environment of an imaging target. The microphone 190 is preferably fixed in the chassis 170. The microphone 190 is preferably electrically connected to and controlled by the control module 130. The microphone 190 is preferably used in conjunction with a microphone of the mobile electronic device 200 to capture stereo audio, but may alternatively be used alone. In another variation, the microphone 190 is preferably used to provide additional depth information or location information to the apparatus 100.

In a variation of the preferred embodiment, the apparatus 100 includes a rotating mechanism 121 for rotating the sensor 120. The rotating mechanism 121 functions to connect the sensor 120 to the chassis 170 and to allow the rotation of the sensor 120 relative to the chassis 170. If the sensor 120 is removable from the chassis 170, the rotating mechanism 121 is preferably fixed to the sensor 120, but alternatively the rotating mechanism 121 may be fixed to the chassis 170 or attached in any other suitable manner. In one example of this variation, the rotating mechanism 121 allows rotation of the sensor to occur in a controlled, mechanical, and manual manner (i.e., turning a knob mechanically connected to the rotating mechanism 121 causes it to rotate slowly and with precision). In another example, the rotating mechanism 121 contains a stepper motor connected to the control module 130 that allows the rotation to be controlled electrically, but still manually, by the software module 150 or by buttons on the apparatus 100. In a third example, the rotating mechanism 121 is controlled electrically and automatically via a connection to the control module 130 and the software module 150 or the calibration module 151. In a fourth example, the rotating mechanism 121 is mechanically and manually controlled, but not with precision (i.e., the rotating mechanism 121 contains a latch: when the latch is unlatched, the mechanism 121 may rotate freely and without resistance and when the latch is latched, the rotating mechanism 121 may not move). The rotating mechanism 121 preferably improves calibration of the sensor 120 to the camera 210.

In a variation of the preferred embodiment, the mobile electronic device 200 has a motion sensor 220. The motion sensor 220 functions to collect data about the motion of the apparatus 100. This data is preferably used to interpret data from the infrared sensor 120 or the camera 210. The motion sensor 220 preferably includes a gyroscope and an accelerometer, but may alternatively include any suitable device for sensing motion that is also part of the mobile electronic device 200 (e.g., the accelerometer and gyroscope present in the iPad). The software module 150 preferably accesses data from the motion sensor 220 and in conjunction with the control module 130 correlates this data to data from the infrared sensor 120 and the camera 210. This correlation preferably is used to change how the 3D data produced by the apparatus 100 is interpreted. For example, if motion is detected by the software module 150 analyzing the image data of the camera 210, but not by the motion sensor 220, the apparatus 100 could treat the motion as of a moving object or objects in the view of camera 210 (i.e., interpret the imaging target as being only imaged from one perspective). This could be useful for purposes such as recording 3D movies. In contrast, if motion is detected by both the software module 150 analyzing the image data of camera 210 and the motion sensor 220, and the motion is detected to be of similar magnitude and direction, the apparatus 100 could treat the motion as motion around a stationary object. In other words, the apparatus 100 could interpret the imaging target as being imaged from multiple perspectives. This could be useful for purposes such as mapping a room in three dimensions. The apparatus 100 preferably detects when motion occurs in the image frame of camera 210 or in the image frame of sensor 120 and determines what motion results from movement of the apparatus 100 and what motion results from object or environmental motion in the field of view of the camera 210 or the sensor 120. The motion sensor 220 is preferably connected to the apparatus 1000 by the data connection between the mobile electronic device 200 and the apparatus 100, but may alternatively connected by any suitable means.

As a person skilled in the art will recognize from the previous detailed description and from the figures and claims, modifications and changes can be made to the preferred embodiments of the invention without departing from the scope of this invention defined in the following claims.

We claim:

1. A real-time 3D capture system for a mobile electronic device having a camera, the capture system comprising:
   an infrared projector that projects a pattern onto an imaging target;
   an infrared sensor that captures the pattern;
   a control module that controls the projector and sensor, takes data from the sensor, determines depth information from the data, and transmits the depth information to the mobile electronic device;
   a battery that provides power to the projector, sensor, and control module;
   a software module connected to the mobile electronic device that controls communication between the control module and the mobile electronic device, wherein communication comprises data from the camera and the depth information; wherein the software module further comprises a calibration module that enables correction for rotation and translation of the infrared sensor relative to the camera for registering the depth information with the output from the camera;
   a mounting bracket that removably couples the capture system to the mobile electronic device such that the capture system when coupled maintains alignment with the camera; and
   a chassis that holds the projector, sensor, control module, and battery, and couples to the mounting bracket, wherein the projector, sensor, and control module are fixed to the chassis.

2. The system of claim 1 further comprising two infrared light-emitting diodes.

3. The system of claim 2 wherein the infrared sensor is a CMOS sensor with a bandpass filter having an infrared passband and the infrared light-emitting diodes emit light within the passband.

4. The system of claim 1 further comprising a wide-angle lens coupled to the mounting bracket such that the wide-angle lens covers the camera of the mobile electronic device when the mounting bracket is coupled to the mobile electronic device.

5. The system of claim 4 wherein the wide-angle lens is fixed to the mounting bracket.

6. The system of claim 1 further comprising a microphone.

7. The system of claim 1 further comprising a mechanism for rotating the infrared sensor.

8. The system of claim 1 wherein the mounting bracket is rigid and attaches to at least two corners of the mobile electronic device.

9. The system of claim 8 further comprising a layer of thermoplastic polyurethane on the surface of the mounting bracket contacting the mobile electronic device.

10. The system of claim 1 further comprising an insulating backplate coupled to the chassis and to the mobile electronic device and having a thermal conductivity of less than 5 W/mK; wherein the chassis has a thermal conductivity of greater than 150 W/mK.

11. The system of claim 1 further comprising a thermoelectric cooler coupled to the infrared projector on one side of the cooler and the chassis on the other side of the cooler.

12. The system of claim 11 further comprising a temperature detection mechanism, wherein the control module controls the thermoelectric cooler based on output from the temperature detection mechanism.

13. The system of claim 1 wherein the battery is connected to the mobile electronic device.

14. The system of claim 13 wherein the battery is fixed to the chassis.

15. The system of claim 1 wherein the control module comprises a system microprocessor and a signal processing microprocessor, and the system microprocessor reduces power to the signal processing microprocessor when the sensor is not in use.

16. The system of claim 1 further comprising a white light-emitting diode.

17. The system of claim 1 wherein the mobile electronic device further comprises a motion sensor and data from the motion sensor is used to interpret data from the infrared sensor or the camera.

18. The system of claim 1 wherein the camera is temporally synchronized to the infrared sensor.

19. A real-time 3D capture system for a mobile electronic device having a camera comprising:
   an infrared projector comprising a laser, lens, and diffraction gratings that projects a pseudo-random speckle pattern onto an imaging target;

a CMOS image sensor with an infrared bandpass filter that captures the pattern;
two infrared light-emitting diodes;
a signal microprocessor that takes data from the sensor, determines depth information from the data, and transmits the depth information to the mobile electronic device;
a system microprocessor that controls the projector, sensor, and signal microprocessor and reduces power to the signal microprocessor when the signal microprocessor is not in use;
a control module comprising the system microprocessor and the signal microprocessor;
a battery that provides power to the projector, sensor, light-emitting diodes, and control module;
a software module connected to the mobile electronic device that controls communication between the control module and the mobile electronic device, wherein communication comprises data from the camera and the depth information;
a calibration module that enables correction for rotation and translation of the sensor relative to the camera for registering the depth information with the output from the camera;
a chassis that holds the projector, sensor, control module, and battery, and couples to the mounting bracket, wherein the projector, sensor, and control module are fixed to the chassis; and,
a rigid mounting bracket that removably couples the capture system to at least two corners of the mobile electronic device such that the capture system when coupled maintains alignment with the camera, and does not prevent the use of a button on the mobile electronic device.

20. The system of claim 1, wherein the software module enables correction for rotation and translation of the infrared sensor relative to the camera by correlating pixels of image data from the camera to pixels of image data from the infrared sensor.

21. The system of claim 7, wherein the mechanism is controlled electrically and automatically via a connection to the calibration module.

22. The system of claim 3, wherein the infrared light-emitting diodes are distinct from the infrared projector and function to invisibly illuminate an imaging target to allow the infrared sensor to capture an imaging target in low ambient light conditions.

* * * * *